US009880592B2

United States Patent
Alvarado et al.

(10) Patent No.: US 9,880,592 B2
(45) Date of Patent: Jan. 30, 2018

(54) MODULARLY-CONSTRUCTED INFORMATION HANDLING SYSTEM HAVING PERFORATED CHASSIS DESIGN FOR RECEIVING VARYING SIZES OF SNAP-IN COMPONENTS

(71) Applicant: DELL PRODUCTS, L.P., Round Rock, TX (US)

(72) Inventors: Daniel Alvarado, Pflugerville, TX (US); Edmond I. Bailey, Cedar Park, TX (US); Walter R. Carver, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/672,574

(22) Filed: Mar. 30, 2015

(65) Prior Publication Data
US 2016/0291635 A1 Oct. 6, 2016

(51) Int. Cl.
G06F 1/16 (2006.01)
G06F 1/18 (2006.01)

(52) U.S. Cl.
CPC .............. *G06F 1/183* (2013.01); *G06F 1/184* (2013.01); *G06F 1/185* (2013.01); *G06F 1/187* (2013.01)

(58) Field of Classification Search
CPC ........ G06F 1/16; G06F 1/1633; G06F 1/1656; G06F 1/184; G06F 1/187; G06F 1/1601; G06F 1/1615; G06F 1/1658; G06F 1/183; G06F 1/185; H05K 7/1418; H05K 7/1429
USPC ................................ 361/726, 679.33–679.39
See application file for complete search history.

(56) References Cited

U.S. PATENT DOCUMENTS

| 3,005,282 | A | 10/1961 | Godtfred |
| 4,597,291 | A | 7/1986 | Motomiya |
| 5,229,919 | A | 7/1993 | Chen |
| 5,349,483 | A | 9/1994 | Tsai |
| 5,650,911 | A | 7/1997 | Scholder et al. |
| 5,680,293 | A | 10/1997 | McAnally et al. |
| 5,687,059 | A | 11/1997 | Hoppal |

(Continued)

OTHER PUBLICATIONS

Wright, Ingrid D., Requirement for Restriction/Election, U.S. Appl. No. 14/672,845, The United States Patent and Trademark Office, dated Jul. 14, 2016.

(Continued)

*Primary Examiner* — Anthony Haughton
*Assistant Examiner* — Ingrid Wright
(74) *Attorney, Agent, or Firm* — Isidore PLLC (57) ABSTRACT

An information handling system (IHS) includes a modularly-constructed chassis for receiving varying sizes of snap-in compute components for assembly of the IHS. The modularly-constructed chassis includes a base panel having a chassis surface that includes more than one engagement feature formed within the chassis surface and a selected at least one of a first tray that is sized to receive a first compute component of a first size and a second tray that is sized to receive a second compute component of a second size. The first and second trays have a bottom surface with more than one complementary engagement feature formed within the bottom surface to snap-in corresponding engagement features of the base panel. The IHS includes one or more connecting cabling interconnecting the at least two compute components.

20 Claims, 5 Drawing Sheets

(56) References Cited

U.S. PATENT DOCUMENTS

| | | |
|---|---|---|
| 5,734,557 A | 3/1998 | McAnally et al. |
| 5,783,771 A | 7/1998 | Copeland et al. |
| 5,858,509 A | 1/1999 | Polch et al. |
| 5,865,518 A | 2/1999 | Jarrett et al. |
| 5,967,633 A | 10/1999 | Jung |
| 5,995,365 A | 11/1999 | Broder et al. |
| 6,122,165 A | 9/2000 | Schmitt et al. |
| 6,125,031 A | 9/2000 | Fiora et al. |
| 6,195,262 B1 | 2/2001 | Bodette et al. |
| 6,201,702 B1 | 3/2001 | Schmitt |
| 6,297,962 B1 | 10/2001 | Johnson et al. |
| 6,349,353 B1* | 2/2002 | Lewis .................. G06F 3/0607 709/238 |
| 6,351,375 B1 | 2/2002 | Hsieh et al. |
| 6,404,642 B1 | 6/2002 | Greenfield et al. |
| 6,496,366 B1 | 12/2002 | Coglitore et al. |
| 6,580,604 B1 | 6/2003 | McAnally et al. |
| 6,600,648 B2 | 7/2003 | Curlee et al. |
| 6,625,033 B1 | 9/2003 | Steinman |
| 6,674,641 B2 | 1/2004 | Jensen et al. |
| 6,675,976 B2 | 1/2004 | Steinman et al. |
| 6,788,542 B2 | 9/2004 | Rumney |
| 6,826,048 B1 | 11/2004 | Dean et al. |
| 6,839,233 B2 | 1/2005 | Cravens et al. |
| 6,851,925 B2 | 2/2005 | Chuang |
| 6,854,174 B2 | 2/2005 | Jiang |
| 6,906,918 B2 | 6/2005 | Rabinovitz |
| 7,123,474 B2 | 10/2006 | Cho |
| 7,151,672 B2 | 12/2006 | Campbell |
| 7,245,490 B2 | 7/2007 | Chou et al. |
| 7,259,962 B2 | 8/2007 | Chen |
| 7,262,958 B2 | 8/2007 | Marroquin et al. |
| 7,453,707 B2 | 11/2008 | Beall et al. |
| 7,483,264 B2 | 1/2009 | Chen et al. |
| 7,545,636 B2 | 6/2009 | Wobig et al. |
| 7,580,260 B2 | 8/2009 | Figuerado |
| 7,589,966 B2 | 9/2009 | Ong et al. |
| 7,606,044 B2 | 10/2009 | Bailey et al. |
| 7,623,344 B2 | 11/2009 | Beall et al. |
| 7,639,486 B2 | 12/2009 | Champion et al. |
| 7,821,790 B2 | 10/2010 | Sharma et al. |
| 7,845,903 B2 | 12/2010 | Li |
| 7,909,312 B2 | 3/2011 | Ogata |
| 8,045,339 B2 | 10/2011 | Pav |
| 8,116,076 B2 | 2/2012 | Cochrane |
| 8,363,414 B2 | 1/2013 | Peng et al. |
| 8,411,432 B1* | 4/2013 | Zimlin .................. G06F 1/1616 361/679.34 |
| 8,427,828 B2 | 4/2013 | Kehret et al. |
| 8,437,133 B2 | 5/2013 | Bhutani et al. |
| 8,451,600 B1* | 5/2013 | Ross .................. H05K 7/20545 165/80.3 |
| 8,665,590 B2 | 3/2014 | Wang |
| 8,755,192 B1 | 6/2014 | Schrempp et al. |
| 8,757,739 B2 | 6/2014 | Chen et al. |
| 8,787,013 B1 | 7/2014 | Czamara et al. |
| 2003/0016504 A1 | 1/2003 | Raynham |
| 2005/0185370 A1 | 8/2005 | Chung |
| 2005/0257232 A1 | 11/2005 | Hidaka |
| 2006/0120040 A1 | 6/2006 | Chen |
| 2006/0120041 A1 | 6/2006 | Chen |
| 2006/0274498 A1 | 12/2006 | Chen |
| 2008/0253077 A1 | 10/2008 | Miyamoto et al. |
| 2009/0009961 A1 | 1/2009 | Li |
| 2009/0021911 A1 | 1/2009 | Lee et al. |
| 2009/0021912 A1 | 1/2009 | Yin |
| 2009/0152216 A1 | 6/2009 | Champion et al. |
| 2009/0257187 A1 | 10/2009 | Mills et al. |
| 2010/0026148 A1 | 2/2010 | Zhang et al. |
| 2010/0061051 A1 | 3/2010 | Cochrane |
| 2010/0177487 A1 | 7/2010 | Arshad et al. |
| 2010/0232976 A1 | 9/2010 | Li |
| 2012/0010754 A1 | 1/2012 | Matteson |
| 2012/0063080 A1 | 3/2012 | Chou |
| 2012/0113591 A1 | 5/2012 | Chuang |
| 2012/0219413 A1 | 8/2012 | Charest |
| 2012/0327599 A1 | 12/2012 | Dickinson |
| 2013/0099645 A1 | 4/2013 | Hsieh et al. |
| 2013/0265725 A1 | 10/2013 | Harvilchuck |
| 2014/0055934 A1 | 2/2014 | Wu et al. |
| 2014/0086732 A1 | 3/2014 | Kelaher et al. |
| 2014/0108692 A1 | 4/2014 | Doglio et al. |
| 2014/0113539 A1 | 4/2014 | Dickinson |
| 2014/0211418 A1* | 7/2014 | Arreola .............. H05K 7/20172 361/695 |
| 2014/0376172 A1* | 12/2014 | Love .................. G06F 1/1632 361/679.41 |
| 2015/0366096 A1* | 12/2015 | Bailey .................. H05K 7/1487 361/679.02 |

OTHER PUBLICATIONS

Matey, Michael A., Restriction Requirement, U.S. Appl. No. 14/675,284, The United States Patent and Trademark Office, Sep. 26, 2016, pp. 1-7.

Thaker, Nidhi Vivek, Final Office Action, U.S. Appl. No. 14/673,032, The United States Patent and Trademark Office, dated Oct. 6, 2016, pp. 1-21.

Wright, Ingrid, Non-Final Office Action, U.S. Appl. No. 14/672,845, The United States Patent and Trademark Office, dated Nov. 7, 2016, pp. 1-15.

Dravininkas, Adam, Non-Final Office Action, U.S. Appl. No. 14/675,116, The United States Patent and Trademark Office, dated Aug. 5, 2016.

Thaker, Nidhi Vivek, Non-Final Office Action, U.S. Appl. No. 14/673,032, The United States Patent and Trademark Office, dated Jun. 9, 2016.

Thaker, Nidhi Vivek, Non-Final Office Action, U.S. Appl. No. 14/673,032, The United States Patent and Trademark Office, dated Mar. 28, 2017.

Dravinikas, Adam B., Notice of Allowance, U.S. Appl. No. 14/675,116, The United States Patent and Trademark Office, Mar. 2, 2017.

Matey, Michael A., Non-Final Office Action, U.S. Appl. No. 14/675,284, The United States Patent and Trademark Office, dated Jan. 20, 2017.

Thaker, Nidhi Vivek, Advisory Action, U.S. Appl. No. 14/673,032, The United States Patent and Trademark Office, dated Feb. 13, 2017.

\* cited by examiner

MODULARLY-CONSTRUCTED INFORMATION HANDLING SYSTEM HAVING PERFORATED CHASSIS DESIGN FOR RECEIVING VARYING SIZES OF SNAP-IN COMPONENTS

BACKGROUND

1. Technical Field

This disclosure generally relates to information handling systems (IHSs), and more particular to a modularly-assembled IHS and a chassis supporting modular assembly of compute components to configure the IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An original equipment manufacturer (OEM) of IHSes often assembles an IHS such as an individual server or a rack assembly of a number of rack servers. The OEM then ships the assembled individual server or the rack-assembled IHS to an end user destination. Often these IHSes are built to order. Numerous industry conditions can preclude assembling any particular configuration before an order is received from an end user. For example, processors and other computer technology are rapidly evolving, the cost of certain compute components used in an IHS is subject to volatility, and customer requirements can have great variability. One implication of waiting for customer orders is that the utilization efficiency of the workforce at the OEM is subject to the vagaries in the amount of orders received.

Some end users are sophisticated in their understanding of IHSes and invest in a large number of IHSes for a data center facility. A large order can create a correspondingly large manufacturing delay at the OEM. However, the end user may have the space and personnel required to configure their IHSes onsite. Further, the end user may also have some motivation to select particular compute components to be used within the IHS. In addition, similar considerations can be applicable after deployment of the IHS, particularly for continued servicing and upgrading of the IHSes. The end user typically prefers that the systems they order are economically and quickly shipped and installed at their facility.

BRIEF SUMMARY

The illustrative embodiments of the present disclosure provide a modularly-constructed chassis of an Information Handling System (IHS) for receiving varying sizes of snap-in compute components. In one or more embodiments, the modularly-constructed chassis includes a base panel having a chassis surface that includes more than one engagement feature formed within the chassis surface. At least one of a first tray and a second tray is utilized. The first tray is sized to receive a first compute component. The second tray is sized to receive a second compute component. Each of the first and second trays have a bottom surface with more than one complementary engagement feature formed within the bottom surface to snap into corresponding engagement features of the base panel. The first and second trays respectively support modular insertion of selectable first and second compute components. The first and second trays enable downstream provisioning and assembly of a fully functional IHS using the modularly-constructed chassis and end-user selectable trays and compute components.

According to at least one aspect of the present disclosure, an IHS includes at least one of a first compute component of a first size and a second compute component of a second size. One or more connecting cabling interconnects the at least two compute components. The IHS is configured with a modularly-constructed chassis with a base panel having a chassis surface that includes more than one engagement feature formed within the chassis surface for receiving varying sizes of snap-in compute components for assembly of the IHS. In one or more embodiments, the first and second trays enable downstream provisioning and assembly of a fully functional IHS using the modularly-constructed chassis and end-user selectable trays and compute components.

According to at least one aspect of the present disclosure, a method is provided of manufacturing a modularly-constructed chassis of an IHS. In one or more embodiments, the method includes manufacturing a chassis having a base panel that includes a chassis surface having more than one engagement feature formed within the chassis surface. The method includes forming a selected at least one of a first tray that is sized to receive a first compute component and a second tray that is sized to receive a second compute component. Each of the first and second trays having a bottom surface with more than one complementary engagement feature formed within the bottom surface to snap into corresponding engagement features of the base panel.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DETAILED DESCRIPTION

According to one or more embodiments, a chassis of an Information Handling System (IHS) can be constructed with a grid of perforated holes on a top/receiving chassis surface, providing a universal connecting surface. The top/receiving surface receives a plurality of chassis-level surface mounted/attached (CSM) components, such as a drive tray/bay, that are each snapped into and secured in place by the holes of the chassis and extensions on the bottom of the CSM components. The CSM components can be of different sizes and the grid of holes allows any size CSM component to be utilized by snapping into specific segments of the chassis with the single chassis structure. The CSM components and chassis can be non-metal to reduce weight and cost. Metal or other rigid/structural components can also be utilized and affixed to the chassis for rack mounting and other purposes. The chassis can be placed in an IHS casing having vertical sides along two or more perimeter edges. A snap-in cover member can also be provided, which snaps into and/or attaches to the side walls of the chassis. The cover, chassis, and CSM components can be lightweight, and can be made of biodegradable material. With lighter weight, shipping of the CSM components can be less expensive. The modular structure of the chassis and CSM components allows for downstream assembly of the HIS, including at an end-customer facility using end-customer selected CSMs and associated compute modules.

The present innovation can address aspects of optimizing for warehouse-scale computing by providing revolutionary new ways to lower costs and decrease development and deployment times for scale-out applications with experimental methods of server production. In one aspect, present innovation provides for simplifying the chassis, speeding up qualification of an IHS configuration, leveraging commoditized components of an IHS, and assembling the IHS on site. Thereby, an innovative server supply chain can utilize new materials with revised logistics methods with and simplified on-site assembly to meet hyperscale server demands. End customers can cut lead times to build and install new servers by utilizing on-site storage at a data center and assembly of all server parts, avoiding manufacturing backlogs at an original equipment manufacturer (OEM) and shipping transit times. The simplified chassis and on-site assembly can have further advantages of lower non-recurring engineering costs and retooling savings.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
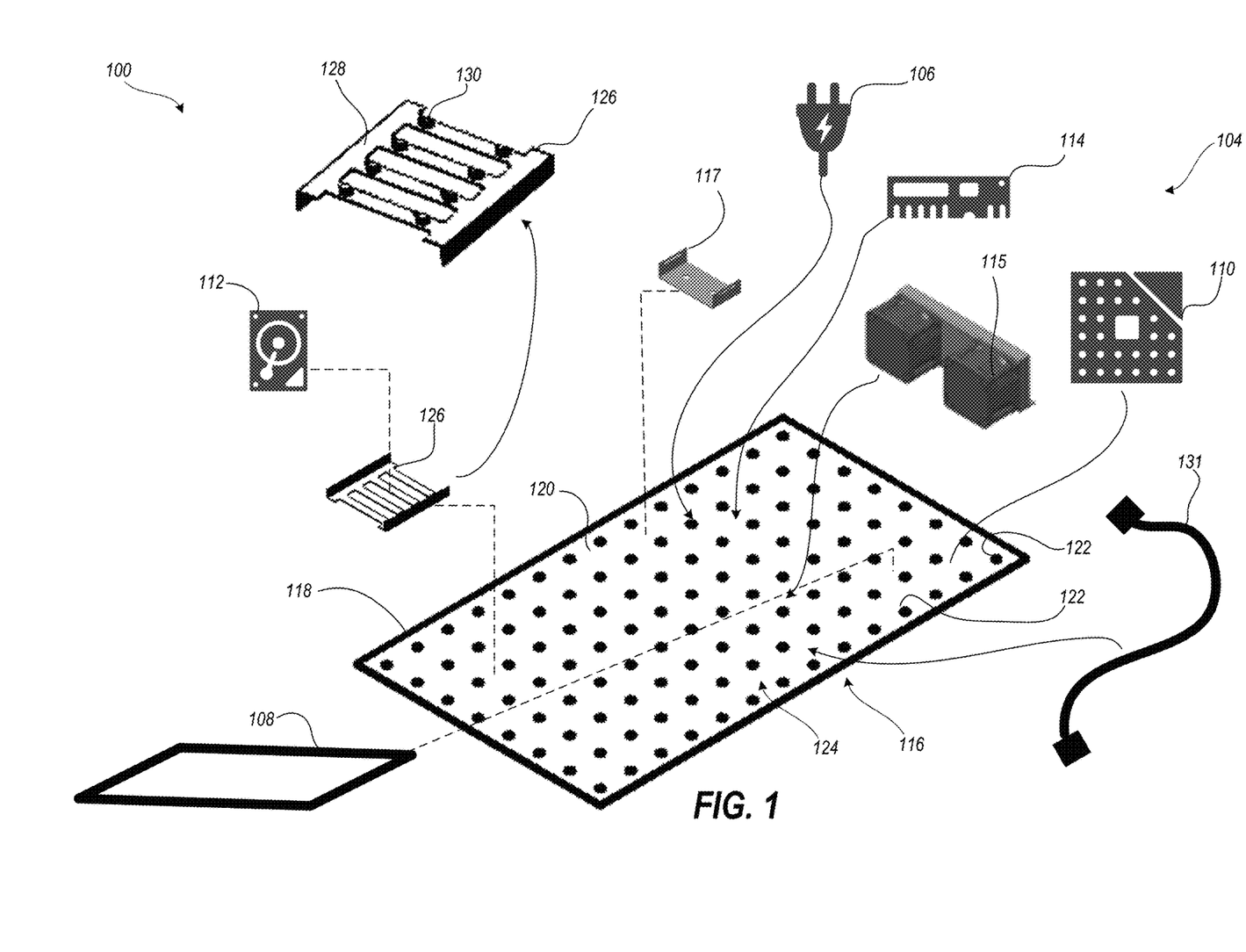
FIG. 1 illustrates a disassembled perspective view of an Information Handling System (IHS) with conceptual compute components and that includes a modularly constructed chassis, according to one or more embodiments.
Figure 2:
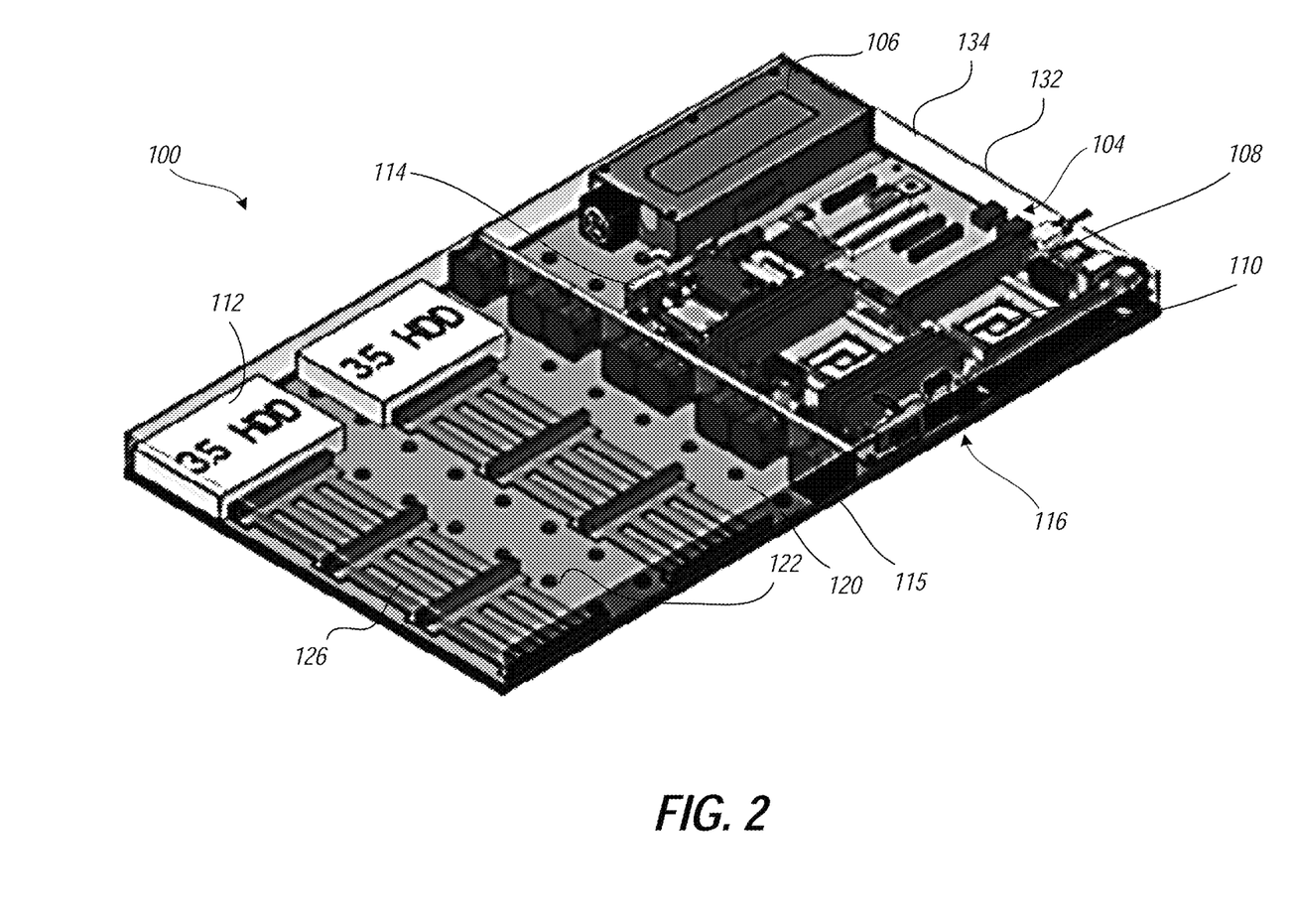
FIG. 2 illustrates a perspective view of the assembled IHS of FIG. 1, according to one or more embodiments.

FIGS. 1-2 illustrate an example IHS 100 that includes a modularly-constructed chassis 116. FIG. 1 specifically illustrates the various modules that are assembled together to provided IHS 100. These modules include the chassis 116 and a plurality of trays (e.g., 117 and 126, general referred to as infrastructure components ) and their corresponding compute components 104. In the presented example, compute components 104 are conceptually depicted as including power supply unit (PSU) 106, motherboard (MB) 108, processor 110, storage drives 112, and memory 114 (FIG. 1). Some infrastructure components (e.g., 117 and 126) can be directly mounted to the base panel 118. Some compute components 104 such as air mover 115 can require the strength, thermal conductivity, or electrical conductivity of an infrastructure component, such as metal support 117. The functional compute components 104 are housed in a modularly-constructed chassis 116 that enables and facilitates selectable end user configuration and assembly of his 100. It is appreciated that modularly-constructed IHS 100 can be a stand-alone IHS or a rack-mounted server, according to one of a plurality of various embodiments of the disclosure. For example, FIG. 2 illustrates an assembled IHS 100 with a 1U height, snap-in cover 132 for a rack-mounted server that forms an enclosure 134 having a 1U height.

For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

A modularly-constructed chassis 116 facilitates simplified assembly for more than one configuration of end-user selected compute components 104. In particular, the modularly-constructed chassis 116 can receive varying sizes of snap-in compute components 104 for downstream provisioning and assembly of a fully functional IHS 100. In one embodiment, the modularly-constructed chassis 116 includes a base panel 118 having a chassis surface 120 that includes more than one engagement feature 122 formed within the chassis surface 120 (FIG. 1). In one embodiment, the engagement features 122 are an array 124 of regularly spaced holes or perforations as a female feature. Trays 117 and 126 collectively referred to as infrastructure components ) that are sized to receive specific compute components 104 of a particular size, such as a storage drive 112, include complementary engagement features 130 formed on or attached to a bottom surface 128. In the illustrated embodiment, these engagement features 130 are a male feature to allow insertion into the female engagement features 122 formed within the chassis surface 120. It is appreciated that the use of male and female engagement features are interchangeable between the chassis 116 and trays 117 and 126, so long as the particular tray has the correct engagement feature to enable physical coupling of the tray onto the chassis surface 120. The complementary engagement features 130 can be snapped in to engage with the opposing engagement features 122 of the base panel 118.

For economy of manufacture and shipping, certain components such as the base panel 118 and trays 117 and 126 of the modularly-constructed chassis 116 can be formed from a lightweight molded material. The material can also have characteristics for vibration dampening, electrical insulation, thermal conduction, electrical conduction or others. In particular embodiments, the lightweight molded material can be biodegradable. Other modules or components requiring additional strength, rigidity, or other material characteristics can be formed from stamped metal. After engaging the compute components 104 either directly or indirectly (via appropriate trays 126) to the base panel 118, compute components 104 are interconnected via connecting cabling 131 to form a functional IHS 100. With the availability of the modular components, the entire assembly process can be performed at an end user location.

Figure 3:
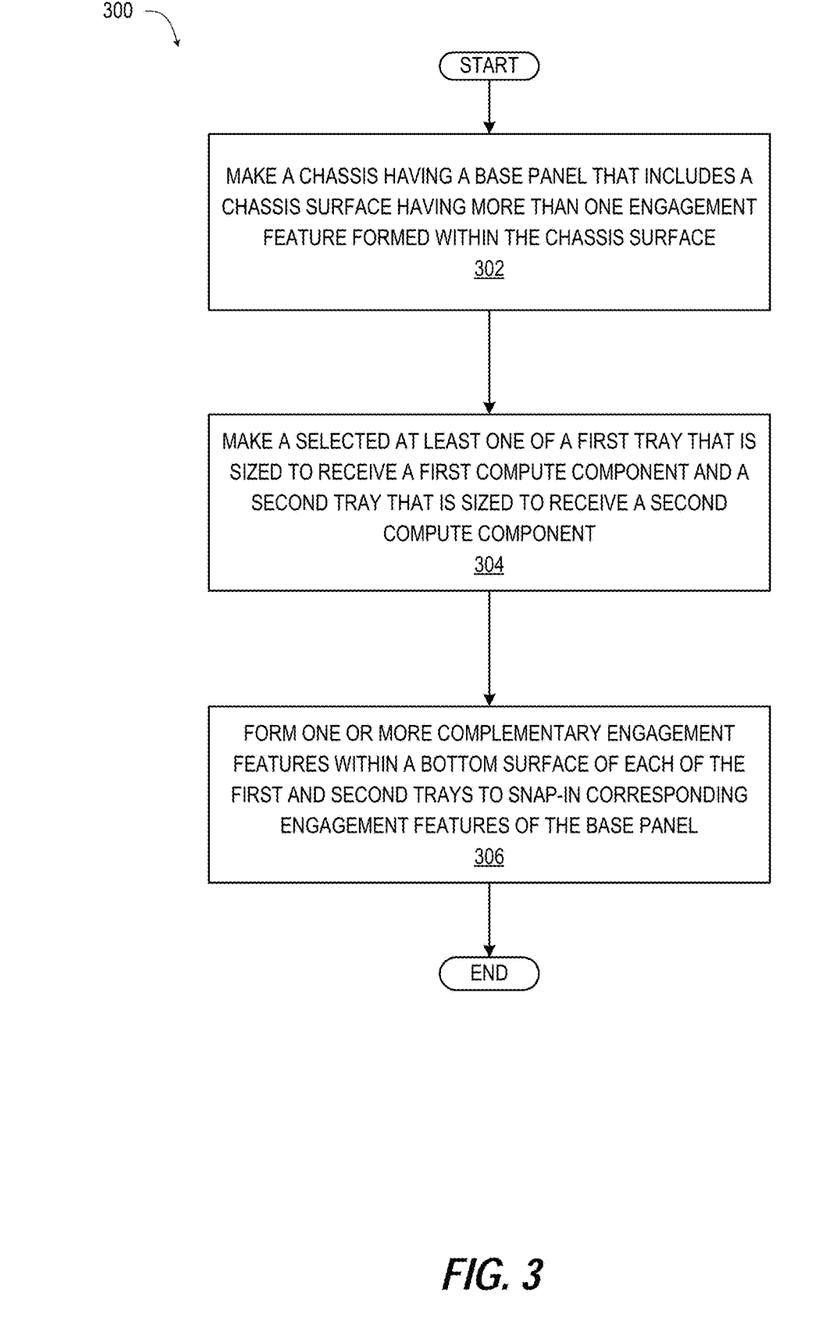
FIG. 3 illustrates a flow diagram of a method of making a chassis of an IHS, according to one or more embodiments.

FIG. 3 illustrates a method 300 of manufacturing support structures for modularly-constructed and modularly-assembled IHSes. In one embodiment, the method 300 includes making a chassis having a base panel that includes a chassis surface having more than one engagement feature formed within the chassis surface (block 302). The method 300 includes making a selected at least one of a first tray that is sized to receive a first compute component and a second tray that is sized to receive a second compute component (block 304). The method 300 includes forming one or more complementary engagement features within a bottom surface of each of the first and second trays to snap-in corresponding engagement features of the base panel (block 306).

Figure 4:
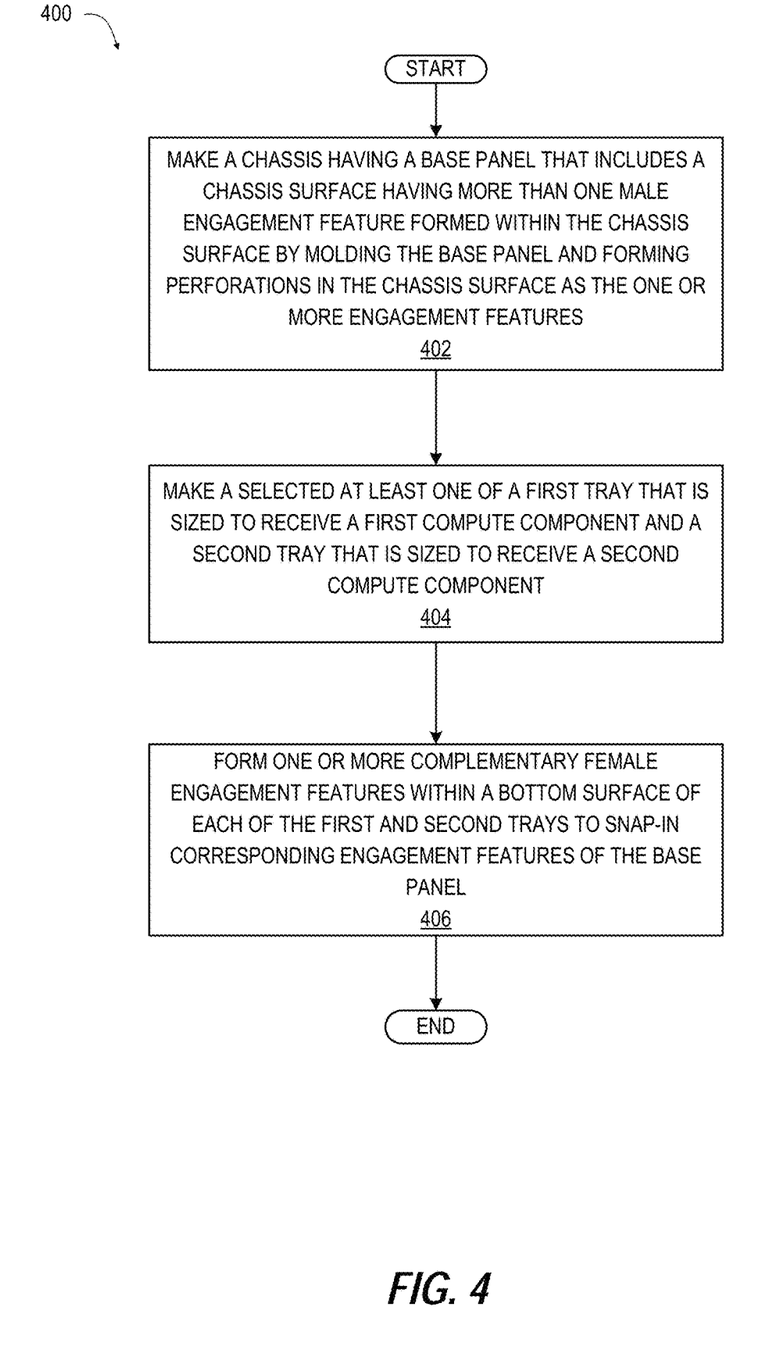
FIG. 4 illustrates a flow diagram method of an example method of making a chassis of an IHS, according to one or more embodiments.

FIG. 4 illustrates a more specific method 400 of manufacturing support structures for modularly-constructed and modularly-assembled IHS. In one embodiment, method 400 includes making a chassis having a base panel that includes a chassis surface having more than one male engagement feature formed within the chassis surface by molding the base panel and forming perforations in the chassis surface as the one or more engagement features (block 402). The method 400 includes making a selected at least one of a first tray that is sized to receive a first compute component and a second tray that is sized to receive a second compute component (block 404). The method 400 includes forming one or more complementary female engagement features within a bottom surface of each of the first and second trays to snap-in corresponding engagement features of the base panel (block 406). Alternatively in one or more embodiments, the base panel can include male engagement features and the trays can include female engagements features.

In the above described flow charts of FIGS. 3-4, one or more of the methods may be embodied in an automated manufacturing system that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Figure 5:
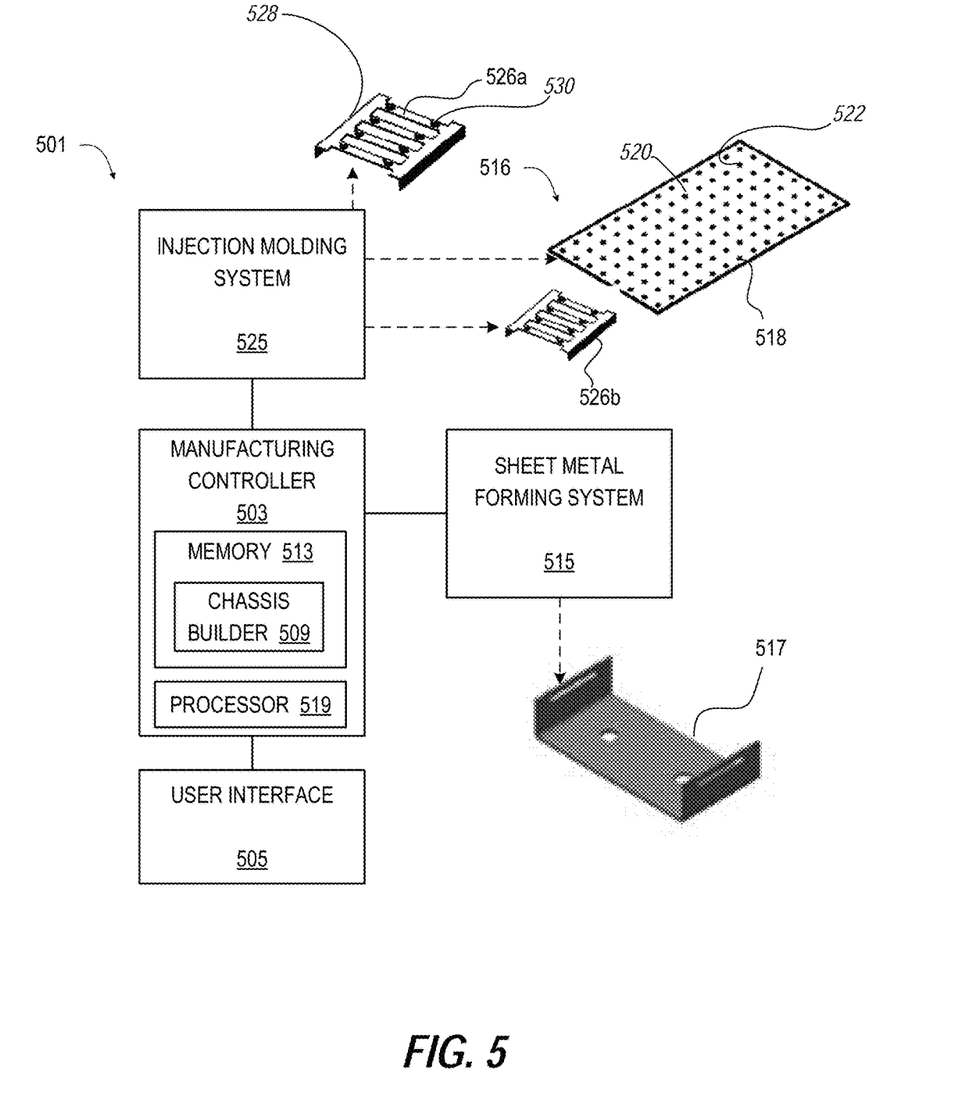
FIG. 5 illustrates a block diagram of a manufacturing system to manufacture support structures of an IHS, according to one or more embodiments.

FIG. 5 illustrates a manufacturing system 501 for manufacturing a chassis 516 of an IHS 100 (FIG. 1). For clarity, a single manufacturing controller 503 forms the chassis 516, although certain processes can be distributed by location or under separate control. A user interface 505 provides a human interface to the manufacturing controller 503 to initiate execution of a chassis builder 509 contained in memory 513 and executed on a processor 519. The manufacturing controller 503 can direct a sheet metal stamping and forming system 515 to form metal infrastructure components 517 of the chassis 516. An injection molding system 525 can convert a flexible material into a base panel 518 and trays 526a-b.

The manufacturing system 501 can manufacture support structures for modularly-constructed and modularly-assembled IHSes 100 (FIG. 1). In one or more embodiments, the manufacturing system 501 can make a chassis 516 having a base panel 518 that includes a chassis surface 520 having more than one engagement feature 522 formed within the chassis surface 520. The manufacturing controller 503 can direct the injection molding system 525 to make a selected at least one of a first tray 526a that is sized to receive a first compute component 104 (FIG. 1) and a second tray 526b that is sized to receive a second compute component 104 (FIG. 1). The injection molding system 525 can form one or more complementary engagement features 530 within a bottom surface 528 of each of the first and second trays 526a, 526b to snap in to corresponding engagement features 522 of the base panel 518.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A modularly-constructed chassis of an Information Handling System (IHS), the modularly-constructed chassis comprising:
    a base panel having a chassis surface;
    more than one engagement features formed within the chassis surface;
    a plurality of infrastructure supports, each for a different compute component, the plurality of infrastructure supports each mounted to more than one engagement feature and having more than one complementary engagement feature, each infrastructure support designed to receive different snap-in compute components of different sizes, the plurality of infrastructure supports including a different size infrastructure support for each of a power supply unit, a motherboard, a processor, storage drives, and a memory, wherein a fully functional IHS is configured on the base panel utilizing the plurality of infrastructure supports and corresponding ones of the power supply unit, the motherboard, the processor, the storage drives, and the memory snapped into a respective infrastructure support and interconnected with connecting cabling, including communication buses.

2. The modularly-constructed chassis of claim 1, wherein one of the more than one engagement feature and the complementary engagement features comprises a male engagement feature and another of the more than one engagement feature and the complementary engagement features comprises a female engagement feature.

3. The modularly-constructed chassis of claim 1, wherein:
    the more than one engagement feature of the chassis surface comprise an array of regularly spaced holes or perforations as female engagement features; and
    the trays include complementary engagement features formed on or attached to a bottom surface of each tray as male engagement features to allow insertion into the female engagement features formed within the chassis surface.

4. The modularly constructed chassis of claim 1, wherein the infrastructure support comprises:
    at least a first tray that is sized to receive a first compute component and a second tray that is sized to receive a second compute component, each of the first and second trays having a bottom surface with more than one complementary engagement feature formed within the bottom surface to snap-in corresponding engagement features of the base panel; and
    wherein the at least one of the first and second trays respectively support modular insertion of selectable first and second compute components and enables downstream provisioning and assembly of a fully functional IHS using the modularly-constructed chassis and end-user selectable trays and compute components.

5. The modularly-constructed chassis of claim 4, wherein the first and second tray comprise a molded material having integrally molded complementary engagement features.

6. The modularly-constructed chassis of claim 4, wherein:
    the first and second tray are made with a vibration isolating material; and
    the first and second compute components each comprise a vibration susceptible compute component.

7. The modularly-constructed chassis of claim 4, further comprising a cover that comprises a molded material and that flexibly engages the base panel to form an enclosure around the inserted compute components.

8. The modularly-constructed chassis of claim 7, wherein at least one of the base panel, first tray, second tray, and the cover comprise a biodegradable material.

9. The modularly-constructed chassis of claim 1, wherein the computer component is an air mover and the infrastructure support includes a metal support that provides strength, thermal conductivity, and electrical conductivity required for the compute component.

10. An information handling system (IHS) comprising:
  a plurality of compute components, including at least a first compute component of a first size and a second compute component of a second size, the plurality of computer components being downstream selectable components and including a power supply unit, a motherboard, a processor, storage drives, and a memory; and
  a modularly-constructed chassis for receiving varying sizes of snap-in compute components for assembly of the IHS, the modularly-constructed chassis comprising:
    a base panel having a chassis surface that includes more than one engagement feature formed within the chassis surface; and
    a plurality of infrastructure supports, each for a different compute component, the plurality of infrastructure supports each mounted to more than one engagement feature and having more than one complementary engagement feature, each infrastructure support designed to receive different snap-in compute components of different sizes, the plurality of infrastructure supports including a different size infrastructure support for each of the power supply unit, the motherboard, the processor, the storage drives, and the memory, wherein the functional IHS is configured on the base panel utilizing the plurality of infrastructure supports and corresponding ones of the power supply unit, the motherboard, the processor, the storage drives, and the memory each snapped into a respective infrastructure support; and
    one or more connecting cabling interconnecting the compute components, the connecting cabling including communication busses.

11. The IHS of claim 10, wherein one of the more than one engagement feature and the complementary engagement features comprises a male engagement feature and another of the more than one engagement feature and the complementary engagement features comprises a female engagement feature.

12. The IHS of claim 10, wherein:
  the base panel comprises a molded material;
  the more than one engagement feature of the chassis surface comprise an array of regularly spaced holes or perforations as female engagement features; and
  the plurality of infrastructure supports include a first tray and a second tray made with a molded material having integrally molded complementary engagement features formed on or attached to a bottom surface of each tray as male engagement features to allow insertion into the female engagement features formed within the chassis surface.

13. The IHS of claim 10, wherein:
  the plurality of infrastructure supports comprises a selected first tray that is sized to receive the first compute component and a second tray that is sized to receive the second compute component, each of the first and second trays having a bottom surface with more than one complementary engagement feature formed within the bottom surface to snap-into corresponding engagement features of the base panel;
  the first and second tray made with a vibration isolating material; and
  the first and second compute components each comprise a vibration susceptible compute component.

14. The IHS of claim 10, further comprising a cover that comprises a molded material and that flexibly engages the base panel to form an enclosure to the compute components.

15. The modularly-constructed chassis of claim 14, wherein at least one of the base panel, first tray, second tray, and the cover comprise a biodegradable material.

16. A method of manufacturing a modularly-constructed chassis of an Information Handling System (IHS), the method comprising:
  manufacturing a chassis having a base panel that includes a chassis surface having more than one engagement feature formed within the chassis surface for mounting a plurality of different infrastructure supports each for a different compute component; and
  forming the plurality of different infrastructure supports, each having more than one complementary engagement feature for mounting to engagement features of the chassis surface, each infrastructure support designed to receive different snap-in compute components of different sizes, and including different sized infrastructure supports for each of a power supply unit, a motherboard, a processor, storage drives, and a memory, wherein a functional IHS is configurable on the base panel utilizing the plurality of infrastructure supports and corresponding ones of the power supply unit, the motherboard, the processor, the storage drives, and the memory each snapped into a respective infrastructure support and interconnected via connecting cabling.

17. The method of claim 16, wherein:
  forming the plurality of different infrastructure supports comprises forming a first tray that is sized to receive a first compute component and a second tray that is sized to receive a second compute component, each of the first and second trays having a bottom surface with more than one complementary engagement feature formed within the bottom surface to snap-into corresponding engagement features of the base panel; and
  the first and second tray are made with a vibration isolating material to accommodate insertion of respective first and second vibration susceptible compute components.

18. The method of claim 17, wherein:
  the more than one engagement feature and the corresponding engagement features comprises a male engagement feature and another of the engagement feature and the corresponding engagement features comprises a female engagement feature;
  the more than one engagement feature of the chassis surface comprise an array of regularly spaced holes or perforations as female engagement features; and
  the plurality of infrastructure supports include a first tray and a second tray made with a molded material having integrally molded complementary engagement features formed on or attached to a bottom surface of each tray as male engagement features to allow insertion into the female engagement features formed within the chassis surface.

19. The method of claim 17, wherein manufacturing the chassis comprises molding the base panel and forming perforations in the chassis surface as the more than one engagement feature.

20. The method of claim 17, wherein forming the selected at least one of the first and second trays comprises molding one of the first and second trays and forming integrally molded complementary engagement features on the bottom surface.

\* \* \* \* \*